(12) United States Patent
Anderson

(10) Patent No.: US 6,760,022 B1
(45) Date of Patent: Jul. 6, 2004

(54) SIMPLE SOFT CREASES FOR SUBDIVISION SURFACES

(75) Inventor: Steven C. Anderson, Minneapolis, MN (US)

(73) Assignee: Autodesk, Inc., San Rafael, CA (US)

(*) Notice: Subject to any disclaimer, the term of this patent is extended or adjusted under 35 U.S.C. 154(b) by 282 days.

(21) Appl. No.: 10/044,418

(22) Filed: Jan. 10, 2002

Related U.S. Application Data

(60) Provisional application No. 60/260,986, filed on Jan. 11, 2001.

(51) Int. Cl.$^7$ .............................................. G06T 17/00
(52) U.S. Cl. ...................................................... 345/420
(58) Field of Search ................................ 345/420, 428, 345/581; 382/254; 358/463

(56) References Cited

U.S. PATENT DOCUMENTS 5,442,462 A * 8/1995 Guissin ....................... 358/463
5,799,111 A * 8/1998 Guissin ....................... 382/254
6,108,487 A * 8/2000 Takeda ........................ 386/124

OTHER PUBLICATIONS

H.Hoppe, T. DeRose et al., Piecewise smooth surface reconstruction, Computer Graphics, 28(3):295–302, Jul.1994.*
Tony DeRose, et al., "Subdivision Surfaces in Character Animation," Pixar Animation Studios, pp. 1–10.

* cited by examiner

*Primary Examiner*—Mark Zimmerman
*Assistant Examiner*—Huedung X. Cao
(74) *Attorney, Agent, or Firm*—Moser Patterson & Sheridan LLP

(57) ABSTRACT

Techniques are provided for creating soft creases for subdivision surfaces. Specifically, techniques are provided for creating an interpolation between a hard crease and a smooth surface. For example, the following steps may be performed to render an object with a soft crease: receiving, in response to user input, a selected value that falls within a range bounded by a first value and a second value; and rendering the object with a soft crease that has an appearance based on the selected value. The soft crease represents an interpolation between a hard crease and a smooth surface. The closer the selected value is to the first value, the more the appearance of the soft crease resembles the hard crease and, conversely, the closer the selected value is to the second value, the more the appearance of the soft crease resembles the smooth surface.

16 Claims, 7 Drawing Sheets

HALF EDGES:

NEW EDGES:

VERTICES, MIDPOINTS, and FACE CENTERS: ○

SIMPLE SOFT CREASES FOR SUBDIVISION SURFACES

This application is related to and claims domestic priority from prior U.S. Provisional Application Serial No. 60/260, 986, filed on Jan. 11, 2001 entitled "Simple Soft Creases For Subdivision Surfaces", by Steve Anderson, the entire disclosure of which is hereby incorporated by reference for all purposes as if fully set forth herein.

FIELD OF THE INVENTION

The present invention relates to computer modeling of geometric shapes and, in particular, to the modeling object surfaces using simple soft creases for subdivision surfaces.

BACKGROUND OF THE INVENTION

In the world of 3 dimensional computer graphics, simple elements such as boxes and spheres are used to construct complex figures. For example, an arm may be initially depicted by joining a couple of boxes together. A mesh is applied to this initial representation of an arm. The mesh subdivides the initial representation of the arm with intersecting lines. Then subdivision algorithms are used to refine the mesh to get a smoother appearing arm.

Subdivision is an algorithmic technique that is used to generate smooth surfaces as a sequence of successively refined polyhedral meshes. Its origin dates back to 1978 when Catmull and Clark first proposed to generalize spline-patch methods to meshes of arbitrary topology. The algorithms they developed are often referred to as Catmull-Clark subdivision rules. These rules are exceptionally simple and work for arbitrary control meshes to produce smooth surfaces. Subdivision-based representations of complex geometry can be manipulated and rendered very efficiently, which makes subdivision a highly suitable tool for interactive animation and modeling systems.

The Catmull-Clark subdivision rules can be expressed as "vertex masks" by which the vertices at a one level (M+1) are constructed from vertices at the previous level (M). The following are the formulas for Catmull-Clark:

Standard Catmull-Clark

In normal Catmull-Clark, the subdivision masks are as follows:

A new level M+1 vertex is created in the center of each face, where the position of the new vertex is determined by the formula:

$$P(F)=\text{Sum}(F.v_j)/F\text{deg} \quad\quad 1.$$

where P(F) is the position of the new vertex in the center of face F;

Sum($F.v_j$) is the sum of the positions of all vertices that define the face F; and F deg is the degree of face F.

A new level M+1 vertex is also created in the center of each edge. The position of each new mid-edge vertex is determined by the formula:

$$P(E)=(E.v_0+E.v_1+P(E.f_0)+P(E.f_1))/4 \quad\quad 2(a).$$

where P(E) is the position of the new vertex in the middle of edge E;

$E.v_0$ and $E.v_1$ are the positions of the two endpoints of edge E;

and $P(E.f_0)$ and $P(E.f_1)$ are the positions of the face centers (as created by equation 1) for each of the two faces which use edge E.

Finally, the position of each level-M vertex is modified by the position of its neighbors to obtain the level M+1 version of the same vertex. For a vertex with valence n (e.g., n faces and n edges), this formula is given by $$P(V)=((n-2)/n)*V+\text{Sum}(V.E_j.ov)/n^2+\text{Sum}(P(V.F_j))/n^2 \quad\quad 3(a).$$

where P(V) is the new position of vertex V;

$V.E_j.ov$ represents the vertex at the other end of edge $V.E_j$ from V (for each edge which uses vertex V);

and $P(V.F_j)$ represents the position of the face center (as created by equation 1) for each of the faces which use vertex V.

Equation 3(a) is referred to herein as the "zero crease vertex rule".

The above completely describes the position of the vertices for the next level. To describe the faces and edges for the next level, we merely note that every face at level M is divided up into a bunch of 4-sided faces at level M+1, as follows: a new face is created in every "corner" of the level-M face using a face point, an edge point, a vertex point, and another edge point. This is illustrated in FIG. 5 and FIG. 6. FIG. 5 shows one face of a level-M mesh. FIG. 6 shows a level M+1 mesh where the one face of the level-M mesh is divided into 4 faces. Each face at level M+1 uses one of the original vertices, plus the edge midpoint on each side, and the face center point. Level M+1 edges are just those resulting from this arrangement of faces—there are new edges connecting edge points with face points as well as dividing the level M edges in two, thus connecting edge points to vertex points.

The subdivided mesh that results from several iterations of Catmull-Clark formulas is very smooth. For example, FIG. 1 illustrates a cube, and FIG. 2 depicts a smooth, spherical shape produced by iteratively applying the Catmull-Clark formulas to all surfaces of the cube in FIG. 1. Unfortunately, smooth surfaces are insufficient in addressing all of the needs of computer graphics. For example, a finger is rounded everywhere except the fingernail. Creases are used to delineate the fingernail. A well established "hard crease" variation on the subdivision rules allows the subdivision result to retain such creases.

Hard Creases

A hard crease may be applied to edges in the original (level-0) mesh to create a discontinuity in the smoothness of a surface. For example, FIG. 3 depicts a shape produced by assigning hard creases to each of the four edges on the top of a box, and then applying the modified subdivision rules as described below.

The path that defines the edges associated with a hard crease is a border between where the smoothness of the various surfaces affect each other. The flat surface top of the shape in FIG. 3 is achieved because the surface top only depends on the four points on the top of the box. The four points at the top of the box do not influence the rest of the points of the box because the hard crease defines the limit of what affects the top surface.

A widely accepted standard for "hard creases" holds that the edges forming the crease should behave like a cubic spline, ignoring the contributions of geometry on either side. The following formulas are standard modifications made to the Catmull-Clark formulas to achieve hard creases:

The formula for determining the position of the vertex at the center of a face is unchanged.

Edge vertices for hard-crease edges discard the face contributions and become simple midpoints:

$$P(E)=(E.v_0+E.v_1)/2 \qquad 2(b).$$

For vertices with 2 hard-creased edges on edges $V.E_{c1}$ and $V.E_{c2}$, contributions are included only from those vertices and their neighbors along the crease:

$$P(V)=3*V/4+(V.E_{c1}.ov+V.E_{c2}.ov)/8 \qquad 3(b).$$

where $V.E_{c1}.ov$ and edges.
Equation 3(b) is referred to herein as the "unmodified 2-crease vertex rule".

Vertices with only 1 creased edge have traditionally been treated the same as non-creased vertices, as in 3(a).

Vertices with three or more creased edges have been fixed in place, i.e.

$$P(V)=V. \qquad 3(c).$$

where vertices with three or more creased edges are herein referred to as "corners", and equation 3(c) is referred to herein as the "corner rule".

The method for creating faces and edges for each subdivision level is identical to the method used in the uncreased version above.

These rules are further disclosed in co-pending application Ser. No. 09/296,046, filed Apr. 21, 1999, by Thomas Burke entitled RELATIONAL MODELING OF TRIMMED NURBS SURFACES, the contents of which is hereby incorporated by reference its entirety.

Although there are methods for creating vertices, modifying those vertices, and creating hard creases, there remains a need for modifying hard creases to achieve an interpolation between hard creases and smooth surfaces. Furthermore there is a need for a simple user interface to execute this interpolation.

SUMMARY OF THE INVENTION

Techniques are provided for creating soft creases for subdivision surfaces. Specifically, techniques are provided for creating an interpolation between a hard crease and a smooth surface at every iteration of subdivision, and providing a mechanism for users to determine the degree to which such an interpolation resembles a hard crease or a smooth surface. Techniques are also provided to more consistently handle vertices with some number of creased edges other than 0 or 2 by interpolating between the unmodified Catmull-Clark vertex rule, the 2-crease vertex rule, and the corner rule, which has 3 or more creases.

According to one embodiment of the invention, the following steps are performed when an object is rendered: receiving, in response to user input, a selected value per edge in the original mesh that falls within a range bounded by a first value and a second value; and rendering the object with a soft crease that has an appearance based on the selected value. The soft crease represents an interpolation between a hard crease and a smooth surface. The closer the selected value is to the first value, the more the appearance of the soft crease resembles the hard crease and, conversely, the closer the selected value is to the second value, the more the appearance of the soft crease resembles the smooth surface.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for creating soft creases for subdivision surfaces is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Figure 3:
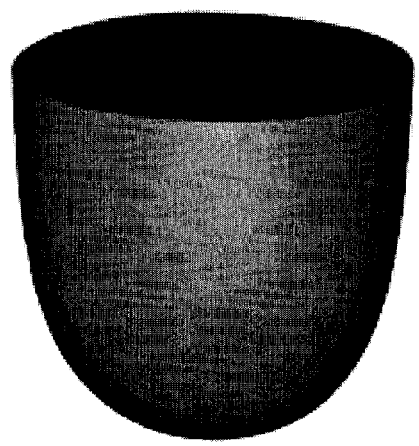
FIG. 3 is a diagram of an object that blends the features of hard creases and smooth surfaces, produced by defining the upper edges of the cube in FIG. 1 to be hard creases and then smoothing the remaining edges.

With time there is more and more demand for increasingly complex computer graphics capabilities. There is a need for modifying hard creases to achieve an interpolation between hard creases and smooth surfaces to create more realistic computer representations. As previously discussed, FIG. 3 depicts objects that were created using hard crease techniques. However, hard crease techniques are not sufficient to depict more rounded creases (hereinafter referred to as "soft creases"). A soft crease is an interpolation between hard creases and smooth surfaces that have no creases. Such a soft crease is depicted on the top of the object in FIG. 4.

According to one embodiment, the depiction of soft creases is accomplished by the application of equations:

(1) edge points in an interpolation between the creased (2(b)) and non-creased (2(a)) cases;
(2) vertex points in an interpolation between the creased and non-creased cases;
(3) a vertex with a single crease;
(4) a vertex with three or more creases, and
(5) crease propagation from one level to the next.

Edge Crease Parameter

According to one embodiment, techniques are provided for presenting users with a simple, easy-to-use parameter associated with each edge in the original mesh for designating the degree to which a smooth crease is to resemble a hard crease or a smooth surface. This parameter shall hereinafter be referred to as the "edge crease parameter". An example of a simple interface for controlling the edge crease parameter is a sliding parameter control that can be varied from 0 (totally uncreased) to 1 (hard creased). The value of this edge crease parameter is fed into algorithms that modify the figure along a designated area, as shall be described in greater detail hereafter.

Smooth Transitions

According to one aspect of the invention, techniques are provided to achieve smoothness with respect to the crease value. For example, the resulting subdivision surface should not "jump" between crease values of 0 and epsilon, or between values of 1 and 1 epsilon (where epsilon represents a very small number), regardless of what the neighboring crease values are. More rigorously, a point p on the limit surface should move continuously as a function of the crease value of any one edge.

The Equations

According to one embodiment of the invention, the following equations are applied to render a smoothed crease whose appearance is governed by an edge crease parameter as described above. While these specific formulas may be used in one embodiment, the specific formulas used to provide smooth creases may vary from implementation to implementation.

For creating a new vertex in the center of each face, Catmull-Clark's equation #1 is used without modification.

For edge points, at every iteration, a linear interpolation is performed between the creased (2(b)) and non-creased (2(a)) cases. Thus, for an edge with an edge crease parameter value c, we use the following equation:

$$P(E)=\frac{1}{4}*[(E.v_0+E.v_1)*(1+c)+(P(E.F_0)+P(E.F_1))*(1-c)] \quad 2(c)$$

where all terms are as defined in 2(a).

Therefore, equation 2(c) represents edge points in an interpolation between a hard crease and a smooth surface at every iteration of a subdivision. When this equation is used to determine the position of a vertex along an edge, an edge crease parameter value of 0 results in a totally uncreased (i.e. smooth) edge, while an edge crease parameter value of 1 results in a hard creased edge.

For vertex points on two variable creases, a linear interpolation is also performed between the creased and non-creased cases, in this case between 3(a) and 3(b). Since the crease values for the edges may not be the same, the crease values are referred to as creases $c_1$ and $c_2$, with an average crease for the vertex $c=(c_1+c_2)/2$. (Recall that these are all in the range [0,1].)

$$P(V)=[(1-c)*(n-2/n)+c*3;4]*V+(1-c)*(Sum(V.E_j.ov)/n^2+Sum(P(V.F_j))/n^2)+c_1*V.E_{c1}.ov/8+c_2*V.E_{c2}.ov/8. \quad 3(d)$$

where P(V) is the new position of vertex V;

$V.E_j.ov$ represents the vertex at the other end of edge $V.E_j$ from V (for each edge which uses vertex V);

$P(V.F_j)$ represents the position of the face center (as created by equation 1) for each of the faces which use vertex V.

and $V.E_{c1}.ov$ and $V.E_{c2}.ov$ are the vertices at the other ends of the two creased edges which use vertex V.

Therefore, equation 3(d) represents vertex points in an interpolation between a hard crease and a smooth surface at every iteration of a subdivision. Equation 3(d) is referred to herein as the "modified 2-crease vertex rule".

In most cases $c_1$ and $c_2$ are equal. However, in modeling some surfaces, such as a fin on a 1950's car, using different values for $c_1$ and $c_2$ is valuable. The fin is smooth at the front and gradually assumes a more creased appearance as an observer's eye moves toward the back of the fin. The appearance of a fin is achieved by applying a control mesh with a series of edges to a basic outline of a fin and then assigning different crease values to the series of edges in the control mesh.

Rather than use the unmodified 3(a) for a vertex with a single crease, the formula for 3(d) is used with $c_2=0$.

$$P(V)=[(1-c_1/2)*(n-2/n)+c_1*\frac{3}{8}]*V+(1-c_1/2)*(Sum(V.E_j.ov)/n^2+Sum(P(V.F_j))/n^2)+c_1*V.E_{c1}.ov/8 \quad 3(e)$$

where all terms are as defined in 3(d).

Therefore, equation 3(e) represents vertex points on a single creased edge by interpolating between the zero creased vertex rule and either the unmodified 2-crease vertex rule or the modified 2-crease vertex rule.

(Note that if $c_1=1$, this produces a single hard crease formula which is one-half the unmodified 3(a) and one-half $\frac{3}{4}V_i+\frac{1}{4}V_i.E_{c1}.ov$—an entirely reasonable compromise between creased and uncreased vertices.)

In one embodiment, the existence of three or more creases is handled by performing a linear interpolation between the "corner" formula 3(c) and the unmodified 3(a), as follows:

$$P(V)=((n-2*(1-c))/n)*V+(1-c)*[Sum(V.E_j.ov)/n^2+Sum(P(V.F_j))/n^2] \quad 3(f).$$

where c is the sum of all crease values on edges using vertex V, divided by 3, but clamped to a maximum value of 1;

P(V) is the new position of vertex V;

$V.E_j.ov$ represents the vertex at the other end of edge $V.E_j$ from V (for each edge which uses vertex V);

$P(V.F_j)$ represents the position of the face center (as created by equation 1) for each of the faces which use vertex V.

Therefore, equation 3(f) represents vertex points for 3 or more creased edges by interpolating between one of the 2-crease vertex rules (e.g., either the unmodified or the modified 2-crease vertex rule), and the corner case.

Although a reasonable compromise, this formula has the drawback of not simplifying to 3(d) and 3(e) when the values align correctly, so there are minor discontinuities whenever a "third" crease value approaches 0.

The method for creating faces and edges for each subdivision level is identical to the method used in the completely uncreased version above.

Finally, crease propagation from one level to the next is used to finish the scheme. Crease propagation works as follows:

1) "New" edges, which are created between a face center and an edge midpoint are assigned crease values of 0.
2) The rest of the edges, at each level, connect edge midpoints with vertex points; therefore, the rest of the edges each represent a half of the original edges (hereinafter referred to as "half edges") in the previous level. These half edges are assigned the same crease values as the original edges in the previous level.

Figure 5:
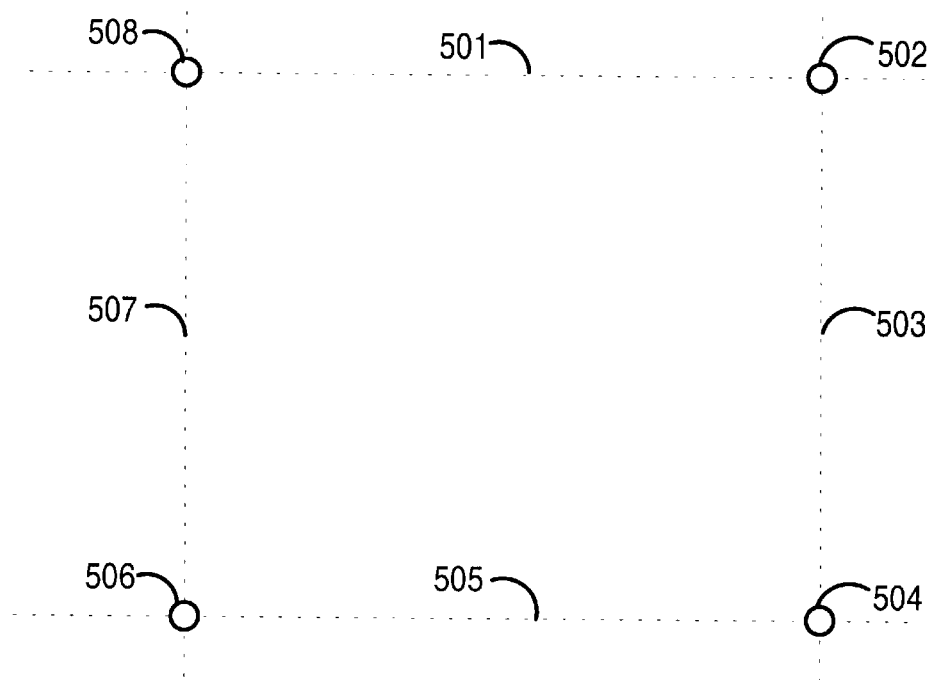
FIG. 5 is a diagram depicting edges and vertices of a level-0 mesh.
Figure 6:
FIG. 6 is a diagram depicting edges and vertices of a level-1 mesh.
Figure 6:
Figure 6:
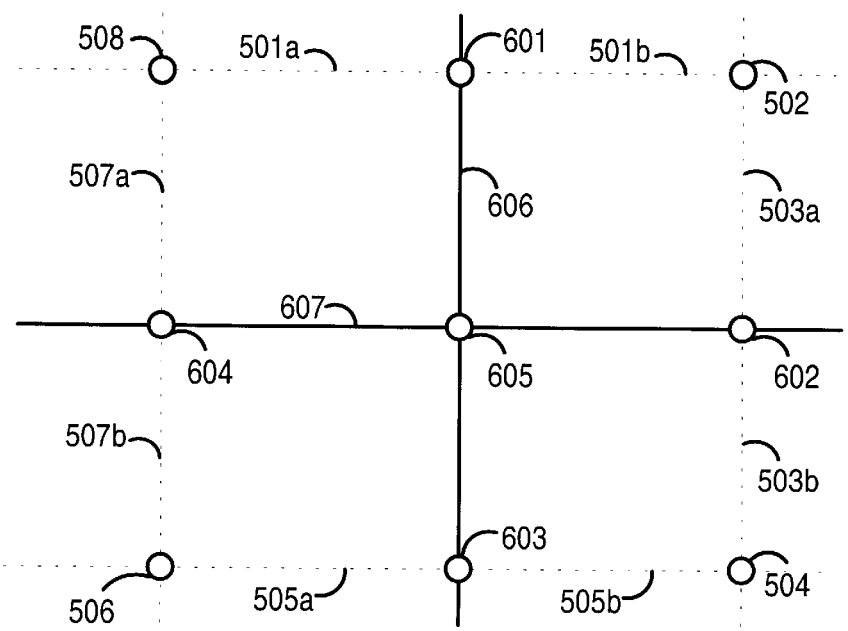

The difference between the original edges and the new edges is illustrated in FIG. 5 and FIG. 6. FIG. 5 shows the edges and vertices of the level-0 mesh. In FIG. 5 the dashed lines depict the original edges and the small circles depict the original vertex points. FIG. 6 shows the edges and vertices of the level-1 mesh. In FIG. 6, the dashed lines depict the half edges, the solid lines depict the new edges, and the small circles depict vertices, midpoints, and face centers. The new edges (606, 607) in FIG. 6 connect the midpoints (601, 602, 603, 604) of the original edges (501, 503, 505, 507) with the center 605 of the original face. The original edges (501, 503, 505, 507) are divided into half edges (501a, 501b, 503a, 503b, 505a, 505b, 507a, 507b), which connect the midpoints (601, 602, 603, 604) with the original vertex points (502, 504, 506, 508). As mentioned above, the new edges (606, 607) receive a crease value of 0 (no crease at all). According to one embodiment, when the level-1 mesh is created, the half edges (501a, 501b, 503a, 503b, 505a, 505b, 507a, 507b) are assigned the same crease values as the original edges (501, 503, 505, 507) in the previous level.

Figure 1:
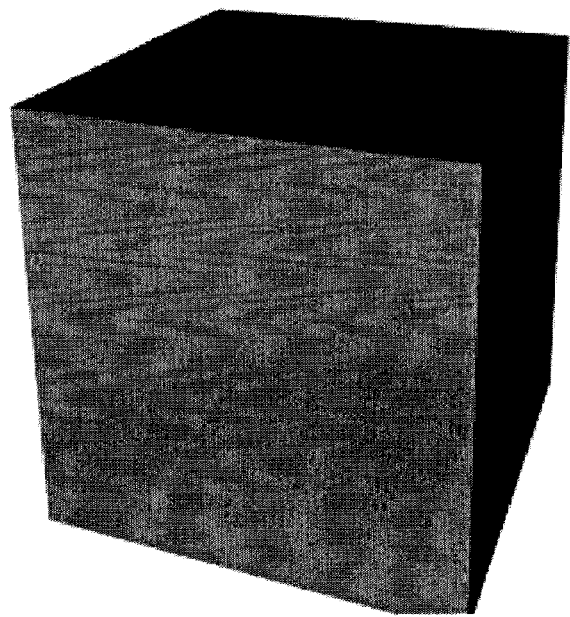
FIG. 1 is a diagram of a cube.
Figure 4:
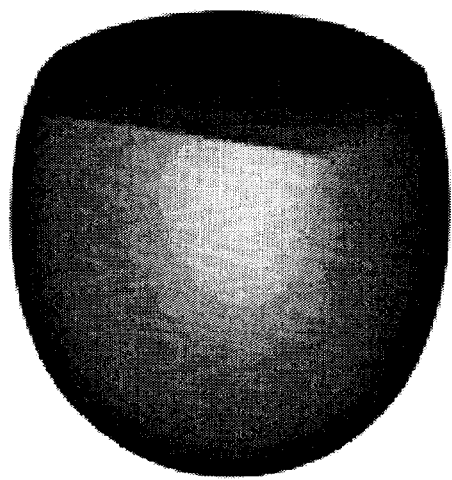
FIG. 4 is a diagram of an object similar to that illustrated in FIG. 3 except the hard creases have been replaced with soft creases created according to an embodiment of the invention.

As a user manipulates the edge crease parameter, the equations respond. The result of setting all four of the top edges of the box in FIG. 1 to a crease value of 0.5 is illustrated in FIG. 4.

Figure 2:
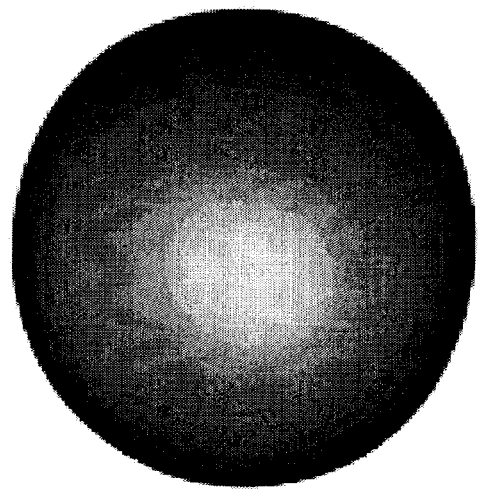
FIG. 2 is a diagram of an object with smooth surfaces produced by smoothing the surfaces of the cube illustrated in FIG. 1.

Equations 1, 2(a), 3(a) are used to create the object in FIG. 2. Equations 1, 2(a), 3(a), 2(b), and 3(b) are used to create the object in FIG. 3. Equations 1, 2(a), 3(a), 2(c), and 3(d) are used to create the object in FIG. 4.

Alternatives, Extensions

The modeling mechanism that is described herein provides an efficient method for producing smooth curved, high-definition surfaces from simpler, rougher mesh models. In describing certain embodiments of the invention, several figures have been used for explanation purposes. However, the invention is not limited to any particular context as shown in the figures, and the spirit and scope of the invention include other contexts and applications in which the mechanisms and processes described herein is available to other mechanisms, methods, programs, and processes. Thus, the specification and drawings are, accordingly, to be regarded in an illustrative rather than a restrictive sense.

For example, although specific object types have been used to illustrate the use of the modeling mechanism, embodiments of the invention are not limited to the modeling of any particular object type.

As a further example, in certain embodiments, crease values may be modified from one iteration to the next as follows: If the creases at a vertex average $v_c$, and the crease on one of those edges is $e_c$, then the crease value for the edge connecting that vertex with that edge midpoint could be set to $(v_c+e_c)/2$.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

Hardware Overview

Figure 7:
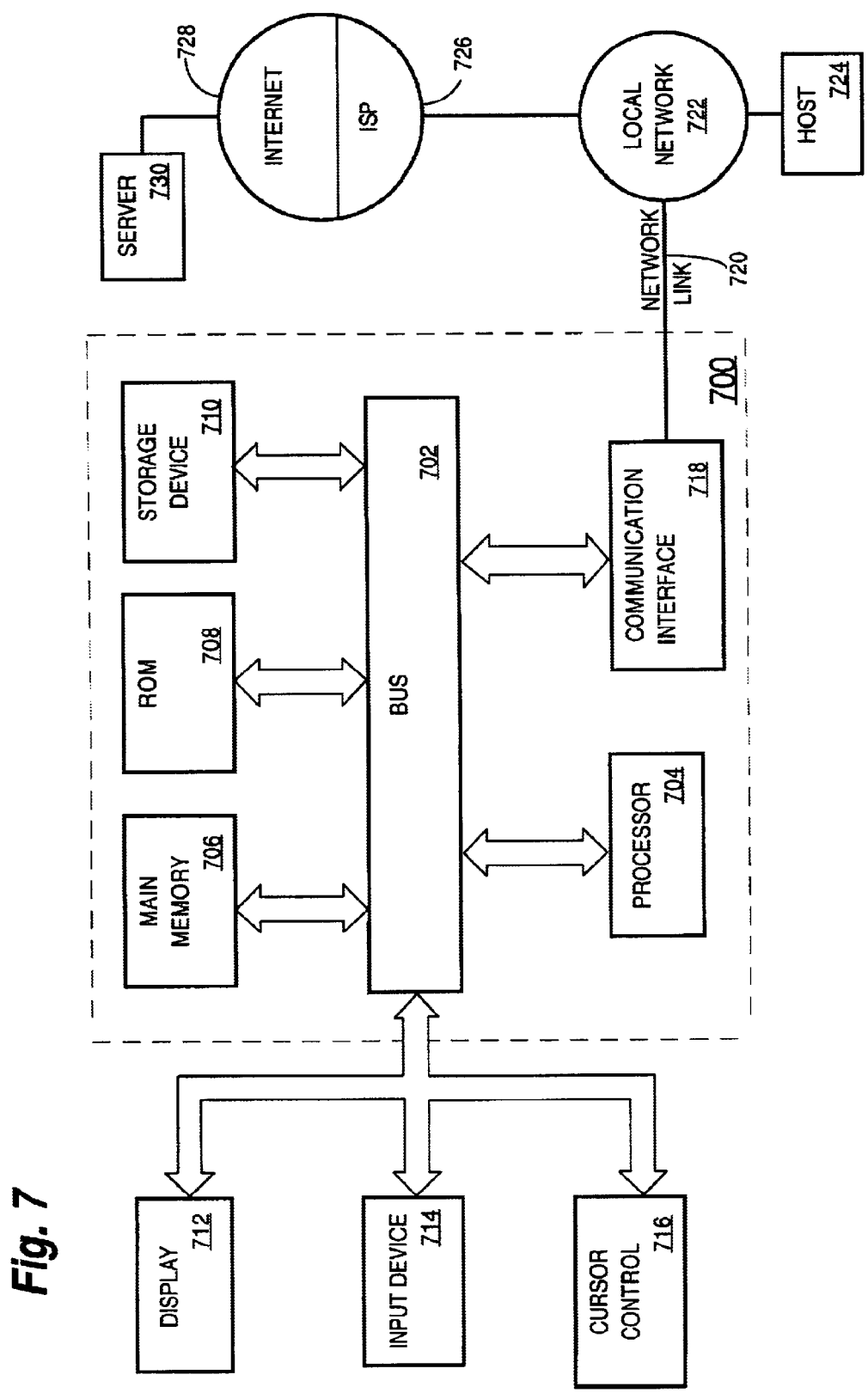
FIG. 7 is a block diagram of a computer system on which embodiments of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for rendering an object, the method comprising the steps of:

receiving, in response to user input, a selected value that falls within a range bounded by a first value and a second value; and rendering said object with a soft crease that has an appearance based on said selected value, the step of rendering including determining a vertex that is created in the middle of an edge, E, based on the equation, $P(E)=\frac{1}{4}*[(E.v_0+E.v_1)*((1+c)+(P(E.F_0)+P(E.F_1))*(1-c)]$;

wherein said soft crease represents an interpolation between a hard crease and a smooth surface;

wherein the closer said selected value is to said first value, the more the appearance of said soft crease resembles said hard crease; and wherein the closer said selected value is to said second value, the more the appearance of said soft crease resembles said smooth surface.

2. The method of claim 1 wherein said selected value is a first selected value and the step of receiving includes the step of:

receiving in response to user input a second selected value when said first selected value is associated with a first edge in a control mesh;

wherein said second selected value is associated with a second edge in said control mesh; and using said first selected value and said second selected value to determine a soft crease between said edges.

3. The method of claim 1 wherein the step of rendering further includes determining a vertex position using two variable creases based on the equation $P(V)=[(1-c)*(n-2/n)+c*\frac{3}{4}]*V+(1-c)*Sum(V.E_j.ov)/n^2Sum(P(V.F_{j))/n}^2)+c_1*V.E_{c1}.ov/8+c_2*V.E_{c2}.ov/8$.

4. The method of claim 1 wherein the step of rendering further includes determining a vertex position with a single crease based on the equation $P(V)=[(1-c_1/2)*(n-2/n)+c_1*\frac{3}{8}]*V+(1-c_1/2)*(Sum(V.E_j.ov)/n^2+Sum(P(V.F_j))/n^2)+c_1*V.E_{c1}.ov/8$.

5. The method of claim 1 wherein the step of rendering further includes determining a vertex position with at least three creases based on the equation $P(V)=((n-2*(1-c))/n)*V+(1-c)*[Sum(V.E_j.ov)/n^2+Sum(P(V.F_j))/n^2]$ where $c=Sum(V.E_j.creasevalue)/3$ with a max value of 1.

6. The method of claim 1 wherein the step of rendering further includes the steps of:

applying a control mesh to said object wherein said control mesh has original edges that connect edge midpoints with vertex points;

creating new edges between a face center and an edge midpoint;

dividing said original edges to create half edges;

assigning a crease value of zero to said new edges; and assigning to said half edges the same crease value that was used for said original edges in a previous level.

7. The method of claim 1 wherein the step of rendering further includes the step of:

determining vertex points on a single creased edge by interpolating between a zero creased vertex rule and one of an unmodified 2-crease vertex rule and a modified 2-crease vertex rule.

8. The method of claim 1 wherein the step of rendering further includes the step of:

determining vertex points for three or more creased edges by interpolating between one of an unmodified 2-crease vertex rule and a modified 2-crease vertex rule, and a corner case.

9. A computer-readable medium carrying one or more sequences of instructions for rendering an object, wherein execution of the one or more instructions by one or more processors causes the one or more processors to perform the steps of:

receiving, in response to user input, a selected value that falls within a range bounded by a first value and a second value; and rendering said object with a soft crease that has an appearance based on said selected value, the step of rendering including determining a vertex that is created in the middle of an edge, E, based on the equation, $P(E)=¼*[(E.v_0+E.v_1)*((1+c)+(P(E.F_0)+P(E.F_1))*(1-c)]$;

wherein said soft crease represents an interpolation between a hard crease and a smooth surface;

wherein the closer said selected value is to said first value, the more the appearance of said soft crease resembles said hard crease; and wherein the closer said selected value is to said second value, the more the appearance of said soft crease resembles said smooth surface.

10. The computer-readable medium of claim 9 wherein said selected value is a first selected value and the step of receiving includes the step of:

receiving in response to user input a second selected value when said first selected value is associated with a first edge in a control mesh;

wherein said second selected value is associated with a second edge in said control mesh; and using said first selected value and said second selected value to determine a soft crease between said edges.

11. The computer-readable medium of claim 9 wherein the step of rendering further includes determining a vertex position using two variable creases based on the equation $P(V)=[(1-c)*(n-2/n)+c*¾]*V+(1-c)*Sum(V.E_j.ov)/n^2+Sum(P(V.F_j))/n^2)+c_1*V.E_{c1}.ov/8+c_2*V.E_{c2}.ov/8$.

12. The computer-readable medium of claim 9 wherein the step of rendering further includes determining a vertex position with a single crease based on the equation $P(V)=[(1-c_1/2)*(n-2/n)+c_1⅜]*V+(1-c_1/2)*(Sum(V.E_j.ov)/n^2+Sum(P(V.F_j))/n^2)+c_1*V.E_{c1}.ov/8$.

13. The computer-readable medium of claim 9 wherein the step of rendering further includes determining a vertex position with at least three creases based on the equation $P(V)=((n-2*(1-c))/n)*V+(1-c)*[Sum(V.E_j.ov)/n^2+Sum(P(V.F_j))/n^2]$ where $c=Sum(V.E_j.creasevalue)/3$ with a max value of 1.

14. The computer-readable medium of claim 9 wherein the step of rendering further includes the steps of:

applying a control mesh to said object wherein said control mesh has original edges that connect edge midpoints with vertex points;

creating new edges between a face center and an edge midpoint;

dividing said original edges to create half edges;

assigning a crease value of zero to said new edges; and assigning to said half edges the same crease value that was used for said original edges in a previous level.

15. The computer-readable medium of claim 9 wherein the step of rendering further includes the step of:

determining vertex points on a single creased edge by interpolating between a zero creased vertex rule and one of an unmodified 2-crease vertex rule and a modified 2-crease vertex rule.

16. The computer-readable medium of claim 9 wherein the step of rendering further includes the step of:

determining vertex points for three or more creased edges by interpolating between one of an unmodified 2-crease vertex rule and a modified 2-crease vertex rule, and a corner case.

* * * * *

UNITED STATES PATENT AND TRADEMARK OFFICE
CERTIFICATE OF CORRECTION

PATENT NO. : 6,760,022 B1
DATED : July 6, 2004
INVENTOR(S) : Steven C. Anderson

It is certified that error appears in the above-identified patent and that said Letters Patent is hereby corrected as shown below:

<u>Column 10,</u>
Lines 21-23, replace the equation "$P(V)=[(1-c)*(n-2/n)+c*3/4]*V=(1-c)*Sum(V.E_j.ov)/n^2Sum(P(V.F_{j))/n}^2)+c_1*V.E_{c1}.ov/8+c_2*V.E_{c2}.ov/8$" with -- $P(V)=[(1-c)*(n-2/n)+c*3/4]*V=(1-c)*Sum(V.E_j.ov)/n^2+Sum(P(V.F_j))/n^2)+c_1*V.E_{c1}.ov/8+c_2*V.E_{c2}.ov/8$ --.

<u>Column 11,</u>
Lines 31-33, replace the equation "$P(V)=[(1-c_1/2)*(n-2/n)+c_13/8]*V+(1-c_1/2)*(Sum(V.E_j.ov)/n^2+Sum(P(V.F_j))/n^2)+c_1*V.E_{c1}.ov/8$" with -- $P(V)=[(1-c_1/2)*(n-2/n)+c_1*3/8]*V+(1-c_1/2)*Sum(V.E_j.ov)/n^2+Sum(P(V.F_j))/n^2)+c_1*V.E_{c1}.ov/8$ --.

Signed and Sealed this

Thirteenth Day of December, 2005

JON W. DUDAS
*Director of the United States Patent and Trademark Office*